United States Patent
Brophy et al.

(10) Patent No.: US 6,532,318 B1
(45) Date of Patent: Mar. 11, 2003

(54) SYMMETRIC WAVELENGTH SELECTIVE SWITCH FOR INTERCONNECTING TWO WDM RINGS

(75) Inventors: Christopher P. Brophy, Corning, NY (US); Robert G. Lindquist, Elmira, NY (US)

(73) Assignee: Corning Incorporated, Corning, NY (US)

( * ) Notice: Subject to any disclaimer, the term of this patent is extended or adjusted under 35 U.S.C. 154(b) by 223 days.

(21) Appl. No.: 09/691,426

(22) Filed: Oct. 18, 2000

(51) Int. Cl.[7] .................................................. G02B 6/26
(52) U.S. Cl. ........................... 385/17; 385/20; 385/24; 385/33; 385/37
(58) Field of Search ............................... 385/17, 20, 37, 385/24, 33

(56) References Cited

U.S. PATENT DOCUMENTS

| | | |
|---|---|---|
| 5,414,540 A | 5/1995 | Patel et al. |
| 5,960,133 A * | 9/1999 | Tomlinson .................... 385/18 |
| 6,188,509 B1 * | 2/2001 | Lee et al. .................... 359/124 |
| 6,360,037 B1 * | 3/2002 | Riza .......................... 359/128 |

OTHER PUBLICATIONS

U.S. patent application Ser. No. 09/458,560, Linquist et al., filed Dec. 9, 1999.

* cited by examiner

Primary Examiner—Hung N. Ngo
(74) Attorney, Agent, or Firm—Harness, Dickey & Pierce P.L.C.

(57) ABSTRACT

A symmetric optical switch for selectively switching wavelength channels between four optical inputs. The symmetric optical switch includes two dispersive elements receiving optical inputs from respective optical fibers where the optical inputs are dispersed into a plurality of wavelength-separated input channels. The symmetric optical switch also includes a plurality of circulators disposed on each optical fiber and a switching array mechanism that receives the plurality of wavelength-separated input channels from each of the dispersive elements. The shutter array simultaneously switches one or more pairs of the wavelength-separated input channels between four optical inputs. Each circulator that is disposed on the associated optical fiber operates with the shutter array to form an eight port device so as to independently switch wavelength channels.

22 Claims, 5 Drawing Sheets

SYMMETRIC WAVELENGTH SELECTIVE SWITCH FOR INTERCONNECTING TWO WDM RINGS

BACKGROUND OF THE INVENTION

1. Field of the Invention

The present invention relates generally to wavelength selective switches. More particularly, the present invention is directed to a symmetric wavelength selective switch for connecting two wavelength division multiplexing (WDM) rings.

2. Technical Background

Communication networks increasingly rely upon optical fiber for high-speed, low-cost transmission. Optical fibers were originally envisioned as an optical replacement for electronic transmission media, such as high-speed coaxial cable and lower-speed twisted-pair cable. However, even high-speed optical fibers are limited by the electronics at the transmitting and receiving ends, generally rated at a few gigabits per second, although 40 Gbit/s systems have been prototyped. Such high-speed electronic systems are expensive and still do not fully exploit the inherent bandwidth of fiber-optic systems. On the other hand, communication networks comprised of only optical components offer many intrinsic advantages over systems that use electronics within any part of the principal transmission path.

Wavelength division multiplexing (WDM) is pervasive in optical communication systems. Generally, wavelength division multiplexing (WDM) electronically impresses different data signals upon different carrier frequencies, all of which are carried by a single optical fiber. Recent research and development has suggested that an all-optical network can be constructed having switching nodes that can switch the separate WDM channels (carrier frequencies) in different directions without the necessity of converting the optical signals to electronic signals.

Figure 1:
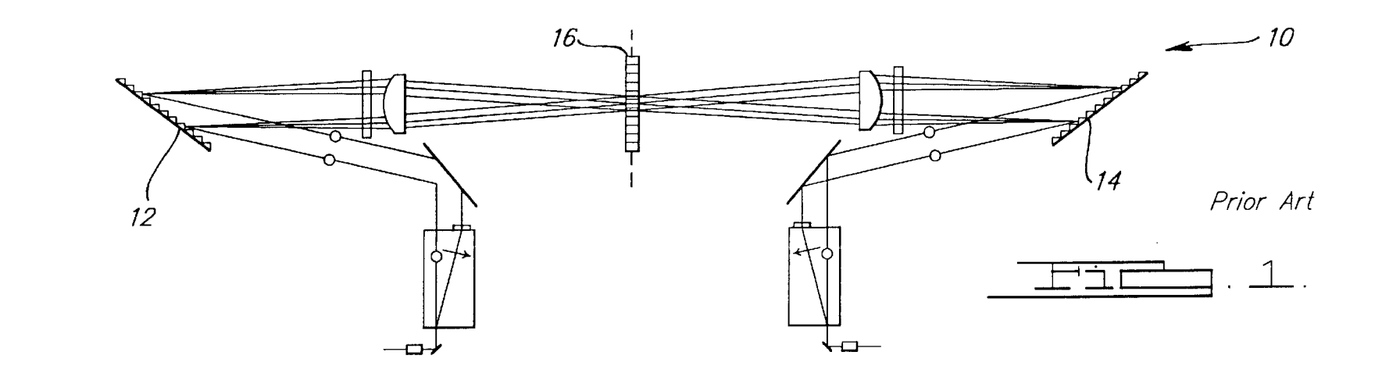
FIG. 1 a side view of a wavelength selective cross-connect switch of the prior art.

A wavelength selective cross-connect optical switch for selectively switching wavelength channels between two optical signals is disclosed in U.S. patent application Ser. No. 09/458,560, filed Dec. 9, 1999, entitled "Wavelength Selective Cross-Connect Switch (WSXC) Using a Micro-Electro Mechanical Shutter (MEMS) Array". A general depiction of the type in the '560 application is illustrated in FIG. 1 of the drawings. The WSXC optical switch 10 includes two dispersive elements 12 and 14, where each dispersive element 12, 14 receives an optical input signal and disperses it into a plurality of wavelength-separated input channels, and a MEMS array 16 receiving the plurality of wavelength-separated input channels from each of the dispersive elements 12, 14 and operative for selectively switching one or more of the wavelength-separated input channels between the optical signals. The WSXC optical switch 10 disclosed in the '560 application is accomplished with simple optical components thereby allowing construction of a sophisticated optical network at relatively low cost. Moreover, the high-speed electronics of the optical network is confined to the system end terminals that require speeds of only the individual channels and not of the total throughput of the system.

While the features of the wavelength selective cross-connect switch disclosed in the '560 application are useful, there is room for improvement, particularly in terms of bulk optics and the switching function. Accordingly, it is desirable to extend the functionality of presently known wavelength selective cross-connect switches beyond a 2×2 switch without adding additional bulk optics.

SUMMARY OF THE INVENTION

In accordance with the teachings of the present invention, a symmetric optical switch for selectively switching wavelength channels between a plurality of optical inputs is disclosed. The symmetric optical switch includes two dispersive elements receiving optical input signals from respective optical fibers where the optical input signals are dispersed into a plurality of wavelength-separated input channels. The symmetric optical switch also includes a plurality of circulators disposed on each of the optical fibers and a switching array mechanism that receives the plurality of wavelength-separated input channels from each of the dispersive elements. The switching array mechanism simultaneously switches one or more pairs of the wavelength-separated input channels between the plurality of optical inputs. Each of the circulators disposed on the optical fibers operate with the shutter array for forming an eight port device so as to independently switch wavelength channels.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various features and embodiments of the invention, and together with the description serve to explain the principles and operation of the invention.

BRIEF DESCRIPTION OF THE DRAWINGS

The various advantages of the present invention will become apparent to one skilled in the art by reading the following specification and appended claims, and by referencing the following drawings in which:

FIG. 6 is a diagram showing an exemplary resonant comb drive in conjunction with the MEM shutter array of the present invention;

DETAILED DESCRIPTION OF THE PREFERRED EMBODIMENTS

Reference will now be made in detail to the presently preferred embodiments of the invention, examples of which are illustrated in the accompanying drawings. Whenever possible, the same reference numerals will be used throughout the drawings to refer to the same or like parts.

Figure 2:
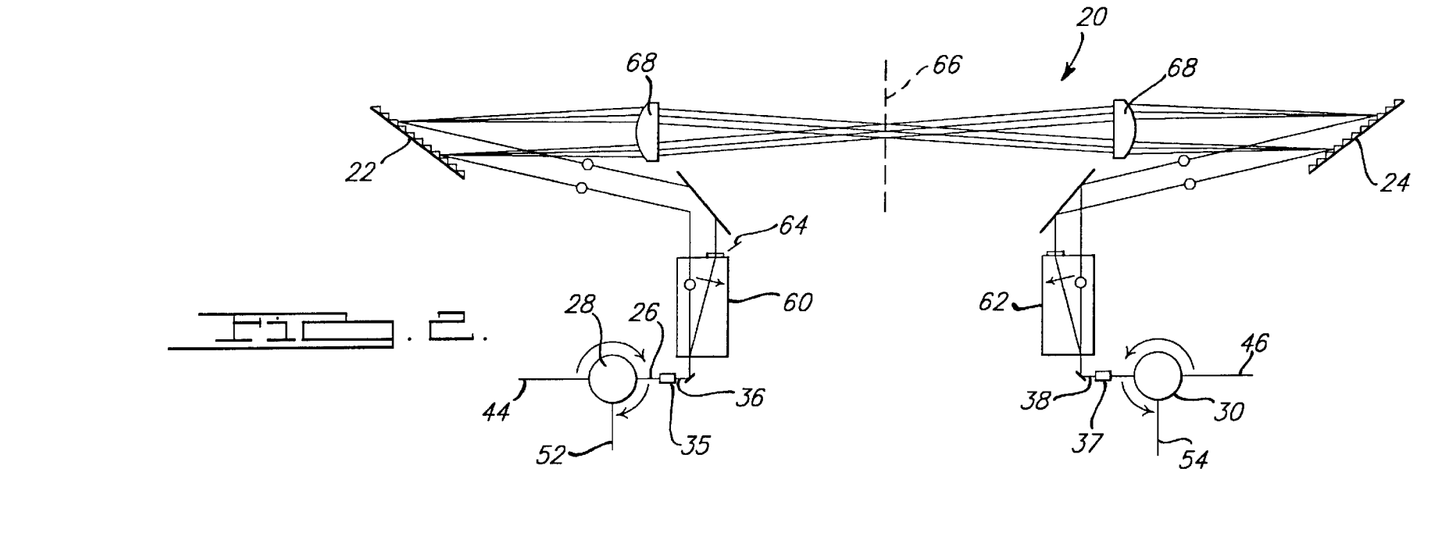
FIG. 2 is a side view of a symmetric WSXC switch in accordance with the present invention.
Figure 3:
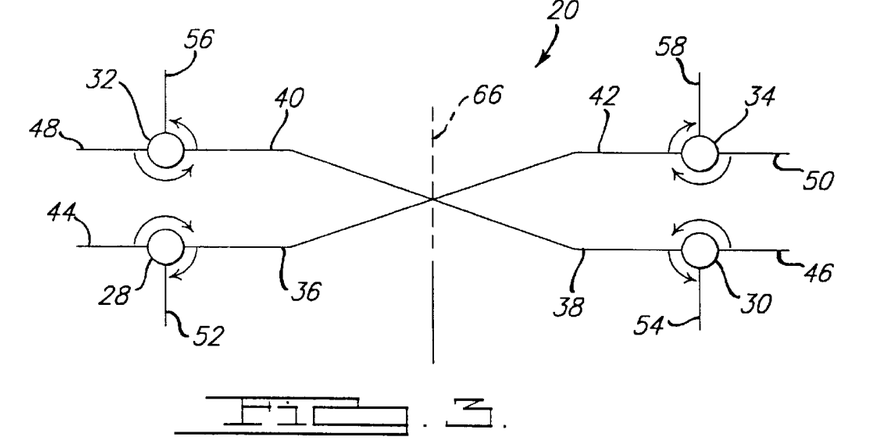
FIG. 3 is a functional top view showing circulators associated with each input/output optical fiber pair of the symmetric WSXC switch in accordance with the present invention.

With reference to FIGS. 2–3 of the drawings, an exemplary embodiment of a symmetric wavelength selective cross-connect (WSXC) switch 20 of the present invention is illustrated. The symmetric WSXC switch has two pairs of non-reciprocal light-direction selective, or light-direction sensitive, circulators 32 and 34 implemented in micro-optics. For illustration purposes, the symmetric WSXC switch 20 of FIG. 2 only includes first and second front circulators 28 and 30 respectively. However, it should be appreciated that the symmetric WSXC switch 20 also includes first and second rear circulators 32 and 34 (see FIG. 3 respectively, which are symmetrically disposed relative to the front circulators 28 and 30.

The circulators are three-port devices having a-one way input port 44–50 a one-way output port 52–58 and a two-way input-output port 26. The two-way input-output port 26 of each circulator 28–34 is connected to its respective optical fiber 36–42 that is associated with symmetrically disposed wavelength dispersive elements 22 and 24. For illustration purposes, FIG. 2 only includes two front optical fibers 36 and 38. However, it should be appreciated that the symmetrical WSXC switch 20 also includes two rear optical fibers 40 and 42 (see FIG. 3) which are in connection with their respective first and second rear circulators 32 and 34. The one-way input and output ports 44–50 and 52–58 of each circulator 28–34 receive and transmit optical input/output signals, thereby creating an eight port device having four input and four output ports. The eight port device including four non-reciprocal circulators routes various carriers along different paths, thereby operating as a 4×4 WSXC optical switch 20.

The symmetric WSXC switch 20 also includes first and second wavelength dispersive elements 22 and 24, and a switching array mechanism 66 positioned between the first and second dispersive elements. The first front and rear circulators 28 and 32 are in connection with the first front and rear optical fibers 36 and 40 for receiving and transmitting the optical inputs, and carrying them to the first wavelength dispersive element 22. Likewise, the second front and rear circulators 30 and 34 are in connection with the second front and rear optical fibers 38 and 42 for receiving and transmitting the optical inputs, and carrying them to the second wavelength dispersive element 24. Each optical input strikes the corresponding wavelength dispersive element 22, 24, thereby spatially separating the optical inputs into a plurality of wavelength-separated input channels. Although the wavelength dispersive elements 22, 24 are preferably diffraction gratings, other active or passive dispersive elements (e.g., a prism) may also be used in the present invention. As will be apparent to one skilled in the art, the number of input channels depends on the number of WDM signal components that are combined on the optical signal carried by the optical fiber.

In addition, a focusing lens 68 is positioned between each wavelength dispersive element 22, 24 and the switching array mechanism 66. Each lens 68 focuses the wavelength-separated input beams onto the individual switching structures 82 (FIGS. 5A–B) of the switching array mechanism 66. The output beams from the switching array mechanism 66 pass through the appropriate focusing lens 68. Each focusing lens 68 serves to recollimate the output beams. After traversing the focusing lens 68, each output beam strikes one of the dispersive elements 22 and 24. In this case, each wavelength dispersive element 22, 24 acts reciprocally to recombine the wavelength-separated output beams into a single output beam. Each output beam is transformed or condensed into its associated optical fiber by collimating lens 35–36 which then in turn transmit the output beam to the respective one-way output ports 52–58 of the circulators 28–34.

To maximize the polarization sensitivity of the wavelength dispersive element 22, 24, the WSXC switch 20 of the present invention may optionally include polarization dispersive elements 60 and 62. One skilled in the art will readily recognize that the polarization dispersive elements 60, 62 serve to spatially separate the different polarization components of each input beam. Preferably, the polarization dispersive elements 60, 62 are a birefringent crystal (e.g., calcite) disposed along the optical path between the optical fibers 36–42 and the wavelength dispersive elements 22, 24. To synchronize the polarization state, a half-wave plate 64 may also be incorporated into one of the polarization dispersive elements, such as element 60, 62. As will be apparent to one skilled in the art, additional optical elements may be utilized for directing the input beams from the polarization components 60, 62 to the wavelength dispersive elements 22, 24.

With reference to FIG. 3 of the drawings, the functionality of the circulators 28–34 in relation to the optical fibers 36–42 and the switching array 66 of the symmetric WSXC switch 20 is illustrated. As previously mention above, the symmetric WSXC switch 20 becomes an eight-port device having four-input 44–50 and four-output 52–58 ports when each circulators 28–34 are added to optical fibers 36–42. More specifically, the first front and rear optical fibers 36 and 40 are connected to the first front and rear circulators 28 and 32, respectively, on one end, and to the first wavelength dispersive element 22 on the other end. Likewise, the second front and rear optical fibers 38 and 42 are connected to the second front and rear circulators 30 and 34, respectively, on one end, and to the second wavelength dispersive element 24 on the other end. Each circulator 28–34 has an input port 44–50 and an output port 52–58 for receiving and transmitting optical input/output signals.

The circulators 28–34 operate in relation to the switching array mechanism 66. When the switching array mechanism 66 for a particular wavelength is closed, wavelength traffic for that particular wavelength is directed to the output fiber port of the alternate circular on the same side of the shutter switches; for example, either between the first front and rear optical fibers 36 and 40, and between the second front and rear optical fibers 38 and 42, depending on which circulator receives the optical input signal. More specifically, if the optical input signal is received by the input port 48 of the first rear circulator 32, the optical output signal is transmitted to the output port 52 of the first front circulator 28. If the optical input signal is received by the input port 44 of the first front circulator 28, the optical output signal is transmitted to the output port 56 of the first rear circulator 32. Likewise, if the optical input signal is received by the input port 50 of the second rear circulator 34, the optical output signal is transmitted to the output port 54 of the second front circulator 30. If the optical input signal is received by the input port 46 of the second front circulator 30, the optical output signal is transmitted to the output port 58 of the second rear circulator 34.

When the switching array mechanism 66 for a particular wavelength is open, wavelength traffic for that particular wavelength is enabled between the first and second optical fibers 36–42. If the optical input signal is received by the input port 48 of the first rear circulator 32, the optical output signal is transmitted to the output port 54 of the second front circulator 30. If the optical input signal is received by the input port 44 of the first front circulator 28, the optical output signal is transmitted to the output port 58 of the second rear circulator 34. Likewise, if the optical input signal is received by the input port 50 of the second rear circulator 34, the optical output signal is transmitted to the output port 52 of the first front circulator 28. If the optical input signal is received by the input port 46 of the second front circulator 30, the optical output signal is transmitted to the output port 56 of the first rear circulator 32.

Each wavelength channels may be switched independently. However, symmetric input pairs are simultaneously switched if switching of one wavelength channel is desired. For example, if the wavelength traffic from the input port 48 of the first rear circulator 32 to the output port 54 of the second front circular 30 for a particular wavelength is open, its symmetric wavelength traffic from the input port 46 of the second front circular 30 to the output port 56 of the first rear circulator 32 should be simultaneously open for the same wavelength in case the switching array mechanism 66 is open. The non-reciprocal circulators 28–34 provide independence from polarization in operation with the switching array mechanism 66. Hence, the symmetric WSXC switch 20 reduces polarization optics required in the prior optical switches because the polarization diversity optics are only retained for efficient operation of the dispersive element. Additionally, the circulators 28–34 isolate the optical signals so that there is no leakage back to the optical paths as well as substantial reduction in loss.

Figure 4:
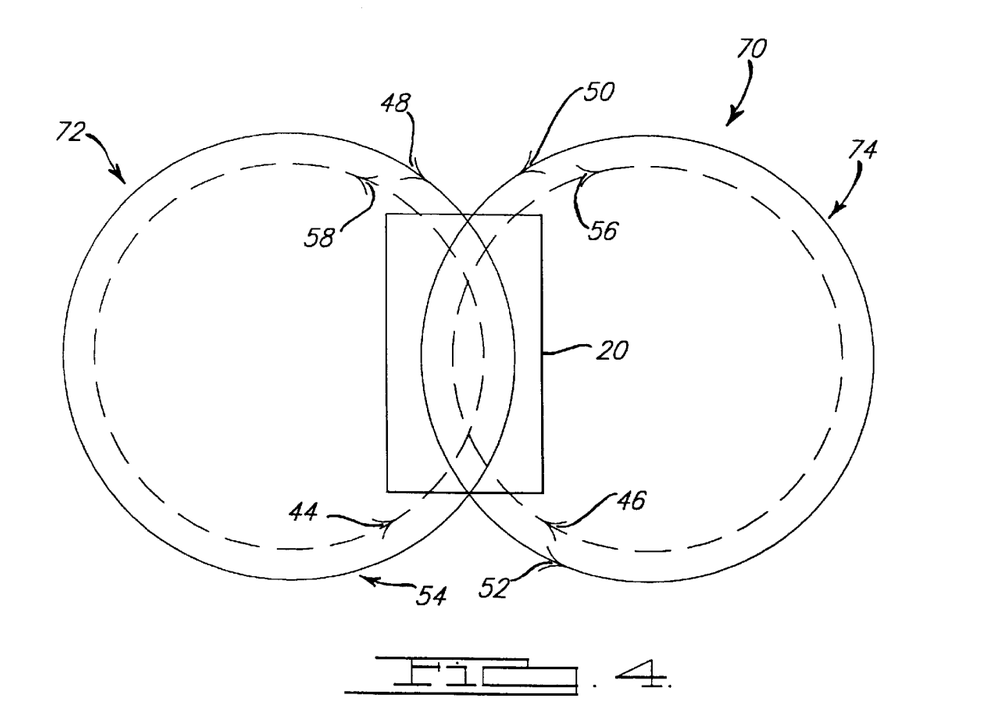
FIG. 4 is a diagram depicting a bidirectional ring network functionally connected to the symmetric WSXC switch of the present invention.

The symmetric WSXC switch 20 has particular utility for a bidirectional ring network 70 as illustrated in FIG. 4 of the drawings. The bidirectional ring network 70 includes first and second rings 72 and 74, respectively. The first ring 72 is capable of switching wavelength channels on the first front and rear input ports 44 and 48 between the second and output ports 58 and 54, respectively. The second ring 74 is capable of switching wavelength channels on the second front and rear input ports 46 and 50 between the first rear and front output ports 52 and 56. When the switching array mechanism 66 for a particular wavelength is closed, bidirectional traffic for that particular wavelength is enabled between the first and second rings 72 and 74. When the switching array mechanism 66 for a particular wavelength is open, bidirectional traffic for that particular wavelength is confined to each ring 72, 74. One skilled in the art will readily recognize that the symmetric WSXC switch 20 may preferably be designed so that channels are confined when the switching array mechanism 66 is open, and interchanged when the switching array mechanism 66 is closed.

Figure 5:
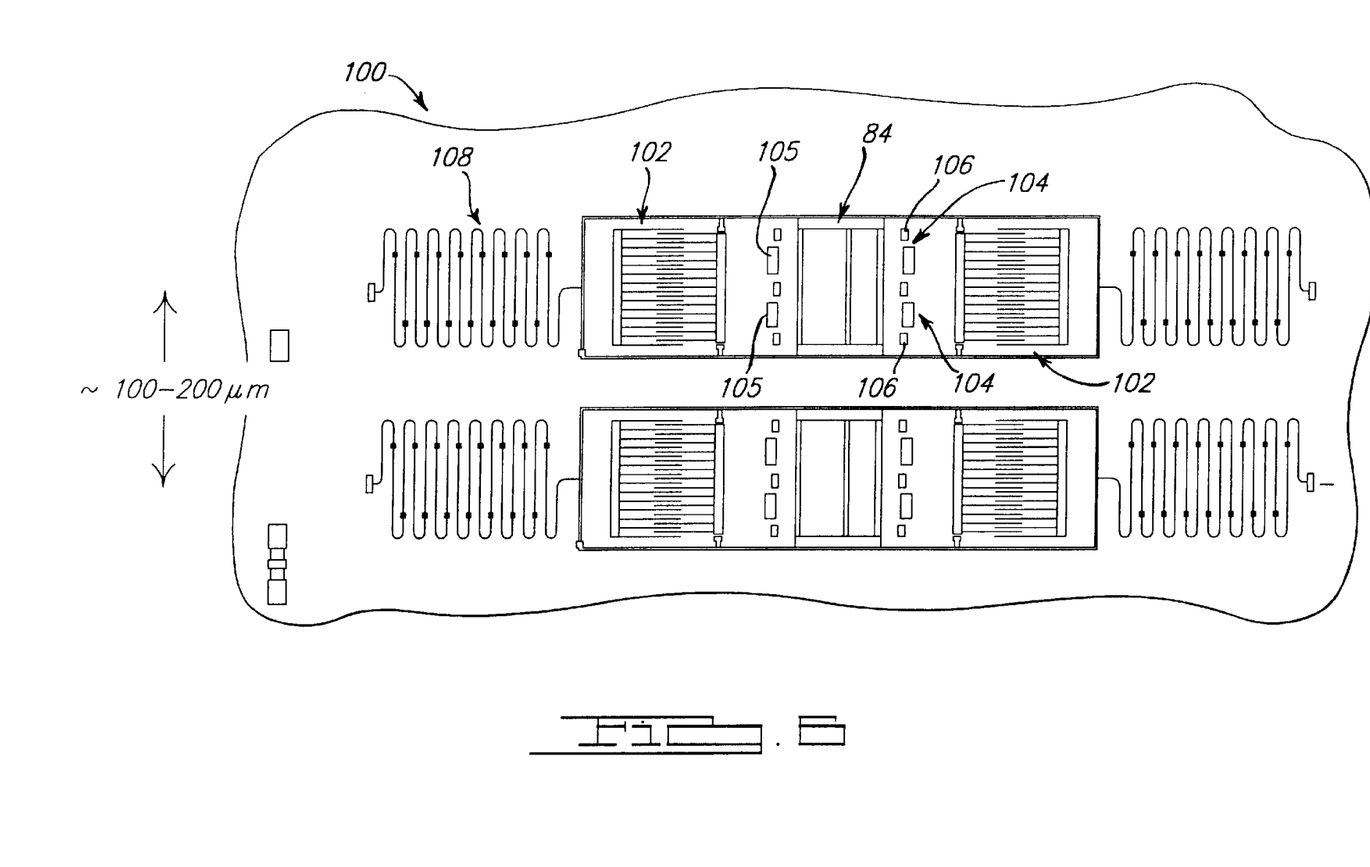
FIGS. 5A and 5B are fragmentary side views of a micro-electro mechanical (MEM) shutter array of the present invention showing the mirror element in a shutter closed position and shutter open position, respectively.
Figure 5A:
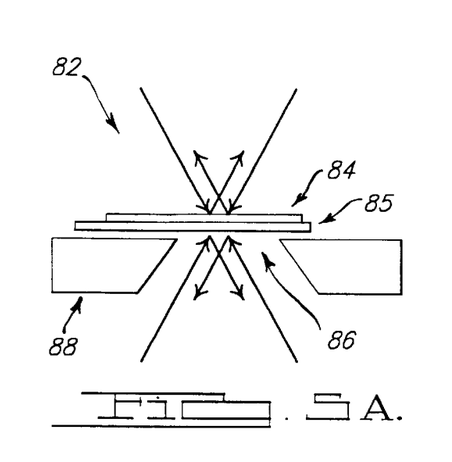
Figure 5B:
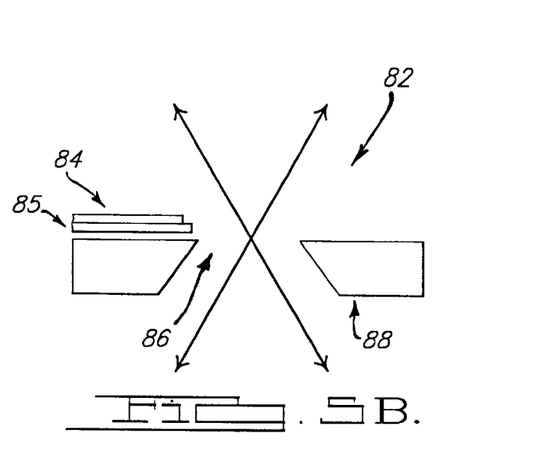

A preferred embodiment of the switching array mechanism 36 is a micro-electro mechanical (MEM) shutter array. The MEM shutter array is constructed using a plurality of switching structures, such that each switching structure corresponds to one of the wavelength-separated input channels. An individual switching structure 82 is shown in FIGS. 5A and 5B. In this structure, a mirror 84 or other reflective element is suspended above an aperture 86 formed in a suitable substrate 88. In one embodiment, mirror 84 may be a layer of gold or other reflective material which is deposited onto one or both sides of a polysilicon member 85. The through aperture 86 is formed by etching the substrate 88 using deep ion etching, wet etching or some other known etching techniques. As will be apparent to one skilled in the art, the MEM shutter array can otherwise be fabricated using either bulk or surface micro-machining techniques. Depending on channel separation and other design criteria for the optical system, each mirror 84 in the shutter array is spaced apart 50 to 200 µm (center to center).

In operation, the mirror 84 is laterally movable between an open shutter position (FIG. 5A) and a closed shutter position (FIG. 5B). In the open shutter position, each input beam passes through the aperture 86 of the switching structure as shown in FIG. 5A. Thus, the input beam passes to the corresponding output channel. In the closed shutter position, both input beams are incident on the mirror 84 as shown in FIG. 5B. In this case, each input beam switches to the corresponding output channel in the other output optic fiber. As will be more fully described below, the actuation of the mirror 84 can be accomplished using a variety of micro-actuator devices.

Figure 7:
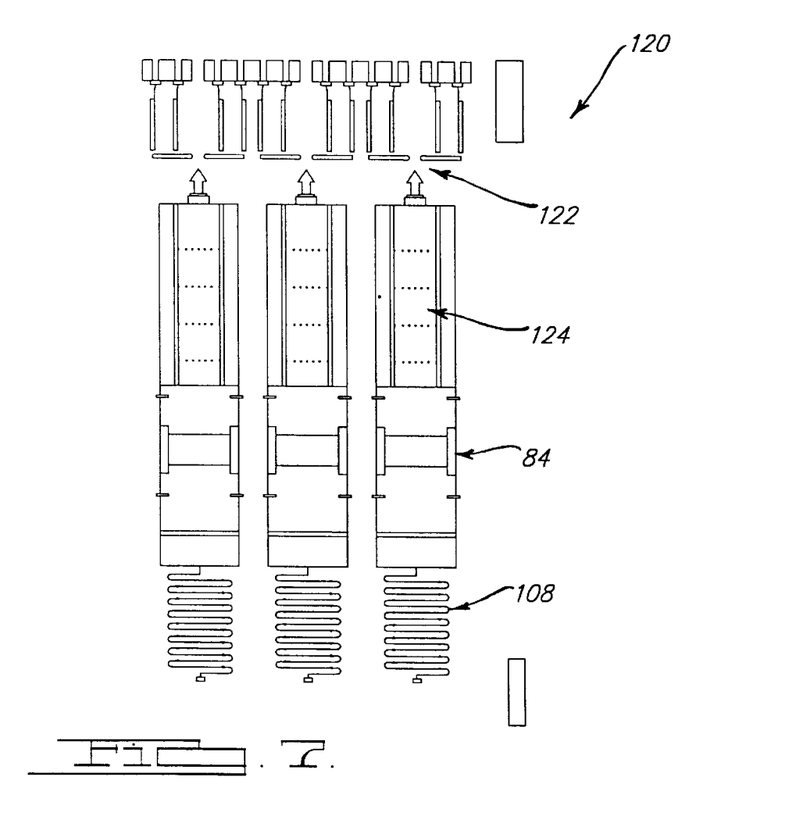
FIG. 7 is a diagram showing an exemplary thermal actuated drive in conjunction with the MEM shutter array of the present invention.
Figure 8:
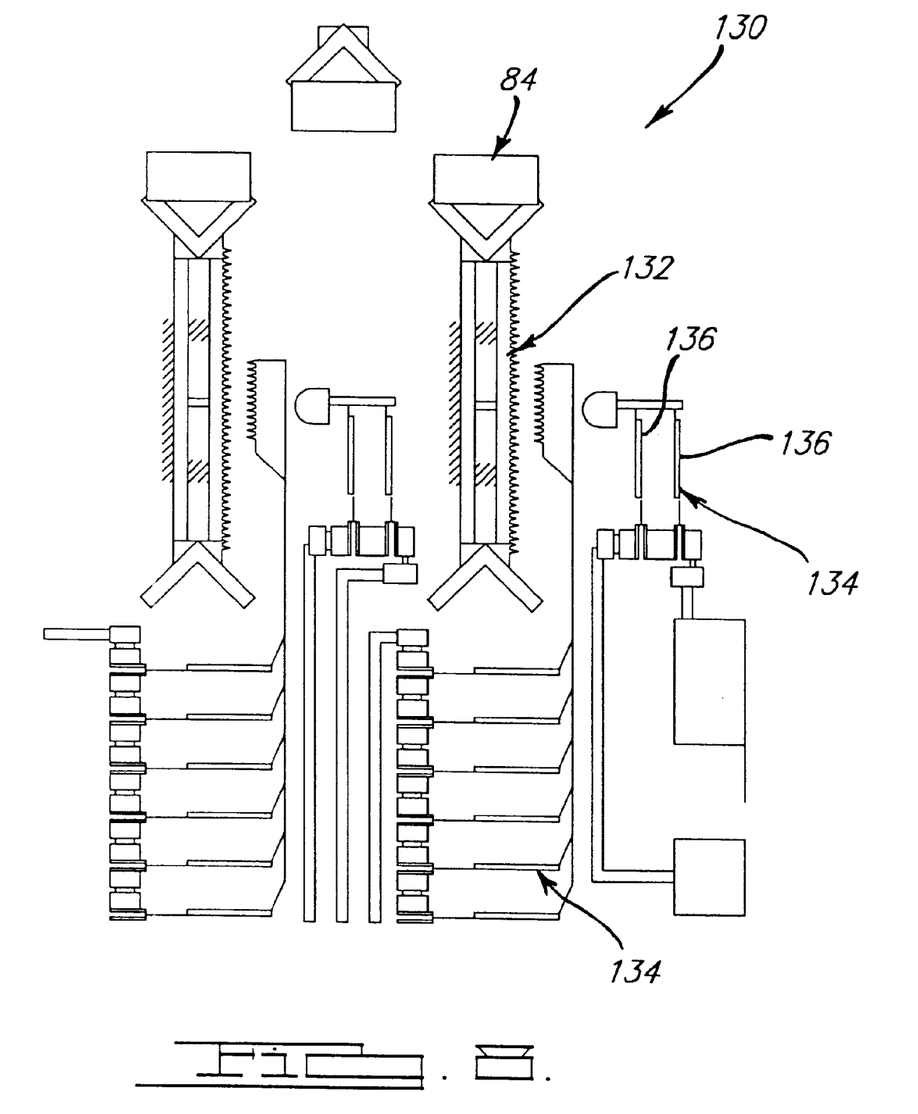
FIG. 8 is a diagram showing an exemplary scratch drive in conjunction with the MEM shutter array in accordance with the teachings of the present invention.

Exemplary micro-actuators for use in the MEM shutter array of the present invention are illustrated in FIGS. 6–8. For example, a resonant comb actuator device 100 is shown in FIG. 6. In this embodiment, the mirror 84 is positioned between two comb drives 102. The resonant comb drives 102 provide the initial displacement of the mirror 84. A clamping voltage is then applied to one or more shutter stops 104 which are positioned between the mirror 84 and one of the comb drives 102. The clamping voltage attracts and holds the mirror 84 near the shutter stops 104, thereby actuating the mirror 84 to an open shutter position. To prevent a short circuit, stopping pillars 106 are positioned between the mirror 84 and the shutter stops 104. To actuate the mirror 84 to a closed shutter position, a clamping voltage is applied to the other set of shutter stops 105. As a result, the mirror 84 is displaced in the opposite direction using the energy stored in the springs 108. While the above description is provided with reference to a resonant comb actuator, it is readily understood that other types of electrostatic actuator devices may also be suitable for use in the MEM shutter array 36 of the present invention.

As shown in FIG. 7, a scratch drive device 120 is an alternative electro-static actuator device which may be used with the present invention. The scratch drive 120 includes a thermal-actuated latch 122 connected to the mule train 124 of the scratch drive. A suitable mirror 84 as disclosed above is connected to the mule train 124. A spring 108 is also connected to the mirror structure 84 for assisting in the movement of the mirror 84.

The preferred type of micro-actuator device for use in the MEM shutter array 36 is an electrothermal actuator 130. Referring to FIG. 8, the mirror 84 is attached to one end of a mechanical slider 132. In order to actuate the mirror 84 between an open shutter and closed shutter position, two or more thermal actuators 134 are positioned at the opposite end of the mechanical slider 132. Each thermal actuator 134 is constructed having two arms 136 formed into a U-shaped asymmetrical microstructure. Because the cross-sectional areas of the arms 136 are different, the electrical resistance varies between the arms. In operation, a current is applied across the arms 136 of the thermal actuator 134. The unequal expansion of the structure causes a lateral movement of the actuator 134. In this way, the mirror 84 is actuated to an open shutter position. Reference is made to U.S. patent application Ser. No. 09/549,381, filed on Apr. 13, 2000 for a more detailed explanation of a similar electrothermal actuator; the disclosure thereof being incorporated herein by reference as though fully set forth in its entirety.

It will be apparent to those skilled in the art that various modifications and adaptations can be made to the present invention without departing from the spirit and scope of the invention. Thus, it is intended that the present invention cover modifications and adaptations of this invention, provided they come within the scope of the appended claims and their equivalents.

What is claimed is:

1. An optical switch, having two dispersive elements for selectively switching wavelength channels between a plurality of optical inputs, each of the dispersive elements receiving the optical inputs from respective optical fibers and dispersing the optical inputs into a plurality of wavelength-separated input channels, the optical switch comprising:

a shutter array for receiving the plurality of wavelength-separated input channels from each of the dispersive elements, the shutter array operative for selectively switching one or more of the wavelength-separated input channels between the optical inputs; and a plurality of circulators disposed on the optical fibers for creating an eight port device, the plurality of circulators operating with the shutter array so as to provide polarization independence.

2. The optical switch of claim 1 wherein each of the circulators are three-port devices comprising:

a one-way input port for being an input;

a one-way output port for being an output; and a two-way input-output port in connection with the optical fibers.

3. The optical switch of claim 2, wherein each optical fiber operates in relation to a symmetrically disposed optical fiber so as to define a bidirectional wavelength channel, the input ports of the circulators that are in association with the bidirectional wavelength channel being switched simultaneously between the optical inputs.

4. The optical switch of claim 1 wherein each of the circulators is non-reciprocal and light-direction selective.

5. The optical switch of claim 1 wherein each wavelength channel is switched independently of the other wavelength channels.

6. The optical switch of claim 1 wherein the eight port device has first and second rings defining a bidirectional ring network operating in association with the shutter array.

7. The optical switch of claim 5 wherein each of the first and second rings includes two input ports and two output ports of two circulators that are in association with each other.

8. The optical switch of claim 5 wherein the first ring provides bidirectional communication traffic in relation to the second ring for a predetermined wavelength when the shutter array is closed.

9. The optical switch of claim 5 wherein each of the first and second rings confines bidirectional communication traffic to each rings for a predetermined wavelength when the shutter array is open.

10. The optical switch of claim 1 wherein the shutter array includes at least one movable switching element for each of the wavelength-separated input channels, each movable switching element receiving an input beam from each of the dispersive elements, the input beam corresponding to one the wavelength-separated input channels.

11. The optical switch of claim 10 wherein each of the movable switching elements is selectively movable between an open position and a closed position, whereby the movable switching element passes an input beam from one of the wavelength-separated input channels to a first output channel in an open position and reflects the input beam to a second output channel in a closed position.

12. The optical switch of claim 11 wherein at least one movable switching element includes a reflecting member and an actuator, the actuator being selected from the group consisting of a thermal actuator, an electro-static actuator, a comb drive actuator and a scratch drive actuator.

13. The optical switch of claim 12 wherein the actuator is one of a thermal actuator, an electrostatic actuator, a comb drive actuator, and a scratch drive actuator.

14. The optical switch of claim 1 further including a focusing lens positioned between the micro-electro mechanical shutter array and each of the dispersive elements.

15. An optical switch, having first and second dispersive elements for selectively switching wavelength channels between optical inputs, each of the dispersive elements receiving the optical inputs in order to disperse the optical inputs into a plurality of wavelength-separated input channels, the optical switch comprising:

a shutter array for receiving the plurality of wavelength-separated input channels from each of the dispersive elements, the shutter array operative for selectively switching one or more of the wavelength-separated input channels between the optical inputs;

first front and rear optical fibers coupled to transmitting the optical inputs to the first dispersive element;

second front and rear optical fibers coupled to transmitting the optical inputs to the second dispersive element;

first front and rear circulators disposed on the first front and rear optical fibers for receiving and transmitting the optical inputs to the respective optical fiber; and second front and rear circulators disposed on the second front and rear optical fibers for receiving and transmitting the optical inputs to the respective optical fiber, wherein the circulators in relation to the shutter array form an eight port device, each of the wavelength channels being independently switched for a predetermined wavelength.

16. The optical switch of claim 15 wherein each of the circulators are three-port devices comprising:

a one-way input port for receiving an input;

a one-way output port for transmitting an output; and a two-way input-output port in communication with the dispersive elements.

17. The optical switch of claim 16, wherein each of the optical fibers have symmetric optical fibers forming a plurality of optical fiber pairs, each of the optical fiber pairs defining bidirectional wavelength traffic.

18. The optical switch of claim 17, wherein the input ports of the circulators that are associated with the bidirectional wavelength traffic are switched simultaneously.

19. A symmetric optical switch for selectively switching wavelength channels between four optical inputs, comprising:

a first dispersive element receiving a first pair of optical inputs and dispersing the first optical inputs into a plurality of first wavelength-separated input channels;

a first focusing lens receiving said plurality of first wavelength-separated input channels;

a second dispersive element receiving a second pair of optical inputs and dispersing the second optical inputs into a plurality of second wavelength-separated input channels;

a second focusing lens receiving said plurality of second wavelength-separated input channels;

a switching array mechanism positionable between said first focusing element and said second focusing element for selectively switching wavelength-separated input channels between said first and second pairs of optical inputs; and four circulators connected to four optical fibers wherein a first pair of optical fibers operates with the first dispersive element and a second pair of optical fibers operates with the second dispersive element, the circulators associated with the first and second pairs of optical fibers forming first and second rings of a bidirectional ring network wherein bidirectional communication traffic for a predetermined wavelength is enabled between the first and second rings when the switching array is closed and is confined to each ring when the switching array is open.

20. The optical switch of claim 19 wherein said switching array mechanism includes a movable switching element for each of said wavelength-separated input channels, the movable switching element selectively movable between an open position and a closed position, such that the movable switching element passes an input beam from one of the wavelength-separated input channels to a first output channel in an open position and reflects the input beam to a second output channel in a closed position.

21. The optical switch of claim 20 wherein at least one of the movable switching elements includes a reflecting member and an actuator, the actuator being selected from the group consisting of a thermal actuator, an electro-static actuator, a comb drive actuator, and a scratch drive actuator.

22. The optical switch of claim 21 further includes a polarization dispersive element positioned prior to said first dispersive elements for spatially separating the different polarization components of said first optical input signal.

* * * * *